United States Patent [19]
Roman

[11] Patent Number: 5,826,619
[45] Date of Patent: Oct. 27, 1998

[54] IRRIGATION CONTROL BOX OF SIMPLIFIED USAGE WITH PRESET PROGRAMS

[75] Inventor: Gianfranco Roman, Pasiano, Italy

[73] Assignee: Claber S.p.A., Fiume Veneto, Italy

[21] Appl. No.: 659,891

[22] Filed: Jun. 7, 1996

[30] Foreign Application Priority Data

Jun. 15, 1995 [IT] Italy .................................. MI95A1282

[51] Int. Cl.⁶ .................................................. G06F 15/46
[52] U.S. Cl. ......................................... 137/624.11; 239/69
[58] Field of Search ...................... 137/624.11, 624.15, 137/624.13; 239/69, 70, 67

[56] References Cited

U.S. PATENT DOCUMENTS

| 4,190,884 | 2/1980 | Medina . | |
|---|---|---|---|
| 4,423,484 | 12/1983 | Hamilton | 239/69 X |
| 4,569,020 | 2/1986 | Snoddy et al. | 239/69 X |
| 4,797,820 | 1/1989 | Wilson et al. . | |

FOREIGN PATENT DOCUMENTS

| 0 469 650 A1 | 2/1992 | European Pat. Off. . |
|---|---|---|
| 0 482 698 A2 | 4/1992 | European Pat. Off. . |
| 86/06579 | 11/1986 | WIPO . |

*Primary Examiner*—Kevin Lee
*Attorney, Agent, or Firm*—Nixon & Vanderhye, PC

[57] ABSTRACT

An irrigation control box comprises an electronic control unit that controls opening and closing of a solenoid valve that intercepts a flow of irrigation liquid. The electronic control unit comprising means for memorizing a plurality of predefined distinct irrigation programs. The control box comprises a rotary switch that can be positioned in a plurality of distinct angular positions, at least equal to the number of said irrigation programs, to determine the selective activation of one of the irrigation programs by the electronic control unit, each irrigation program being associated with a respective angular position of the rotary switch.

7 Claims, 4 Drawing Sheets

IRRIGATION CONTROL BOX OF SIMPLIFIED USAGE WITH PRESET PROGRAMS

BACKGROUND

I. Field of the Invention

The present invention relates to an irrigation control box of simplified usage with preset programs.

II. Related Art and Other Considerations

In the sector of articles for gardening automatic irrigation systems are increasingly gaining ground, comprising electronic control boxes that operate valve means in order to determine automatically the opening and closing times thereof.

Irrigation systems of this kind are for example described in the European patent application No. 0482698 and in the European patent application No. 0703516. Both these irrigation systems comprise an electronic control box that can be programmed by the user by means of a keyboard for the insertion of the data and a display to assist the user during programming.

Although these irrigation systems are very flexible, since they allow the user to set up any desired irrigation program, their programming is rather laborious and it is not easily learned and memorized. Moreover, the control box has to include electrically erasable and programmable memories, that as known are fairly costly.

Irrigation systems are also known wherein the control box contains some stored irrigation programs predefined by the manufacturer and not changeable by the user, that can be selected by means of a keyboard.

These systems are obviously less flexible than the previous ones, but they are simpler to use. Moreover, the control box does not necessarily have to include erasable and programmable memories, but common and more economical ROM memories are adequate. The use, however, of a keyboard to select the desired predefined irrigation program has been shown to be not altogether effective as regards simplicity of use.

In view of the described state of the art, the object of the prevent invention is to provide an irrigation control box that solves the abovementioned problems, namely that it is extremely simple to use.

SUMMARY

According to the present invention, such object is achieved thanks to an irrigation control box comprising an electronic control unit that controls opening and closing of a solenoid valve that intercepts a flow of irrigation liquid. The electronic control unit comprises means for memorizing a plurality of predefined distinct irrigation programs, characterized in that it comprises a rotary switch that can be positioned in a plurality of distinct angular positions, at least equal to the number of said irrigation programs, to determine the selective activation of one of said irrigation programs by the electronic control unit, each irrigation program being associated with a respective angular position of the rotary switch.

The irrigation control box according to the present invention is extremely simple to use, since it is sufficient for the user to rotate the rotary switch until an index provided thereon is brought opposite the desired irrigation program.

BRIEF DESCRIPTION OF THE DRAWINGS

These and other features and advantages of the present invention will be made more evident by the following detailed description of an embodiment thereof, illustrated as a non-limiting example in the enclosed drawings, wherein.

DETAILED DESCRIPTION OF THE DRAWINGS

Figure 1:
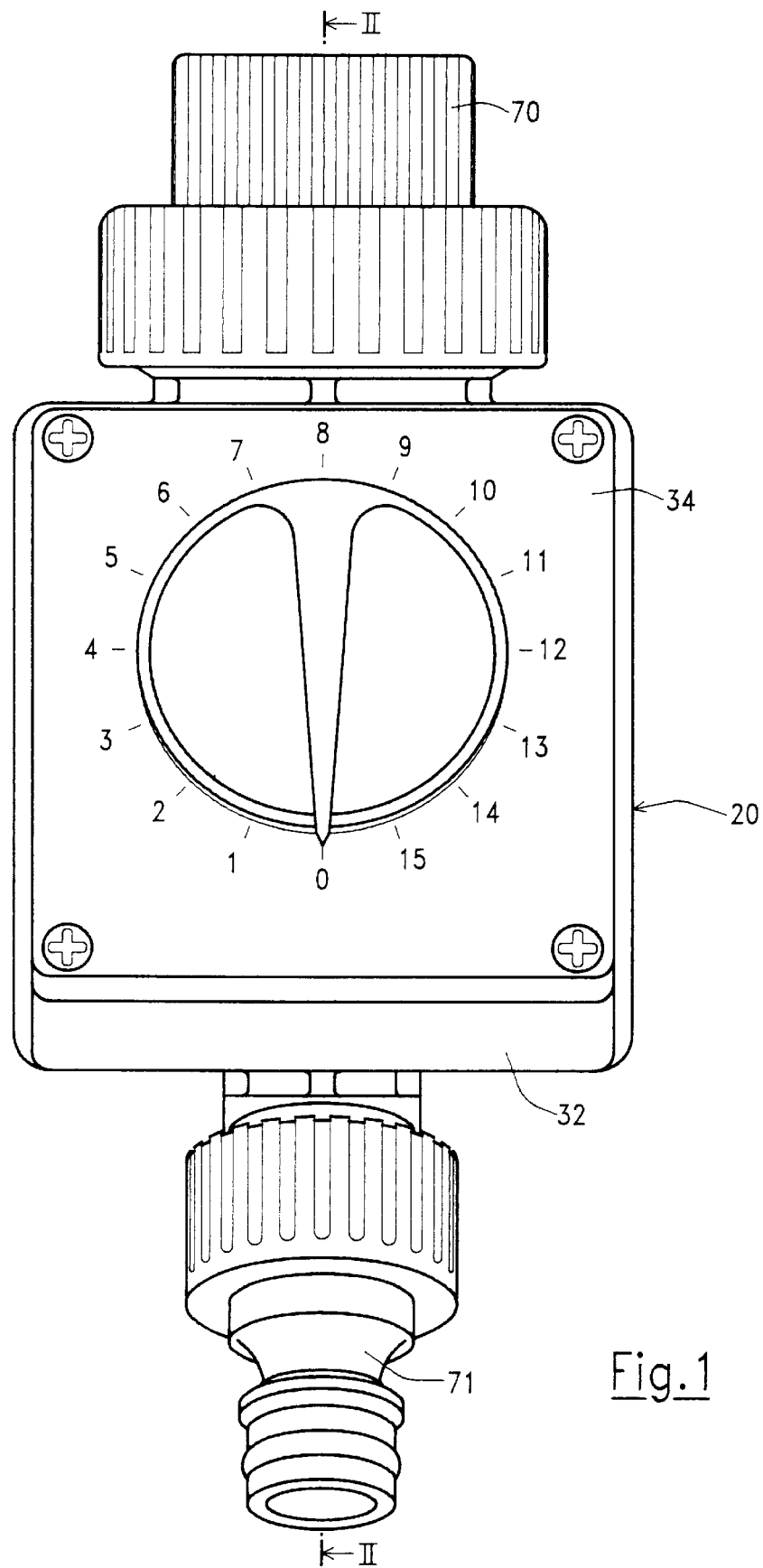
FIG. 1 is a front view of an irrigation control box according to the invention.
Figure 2:
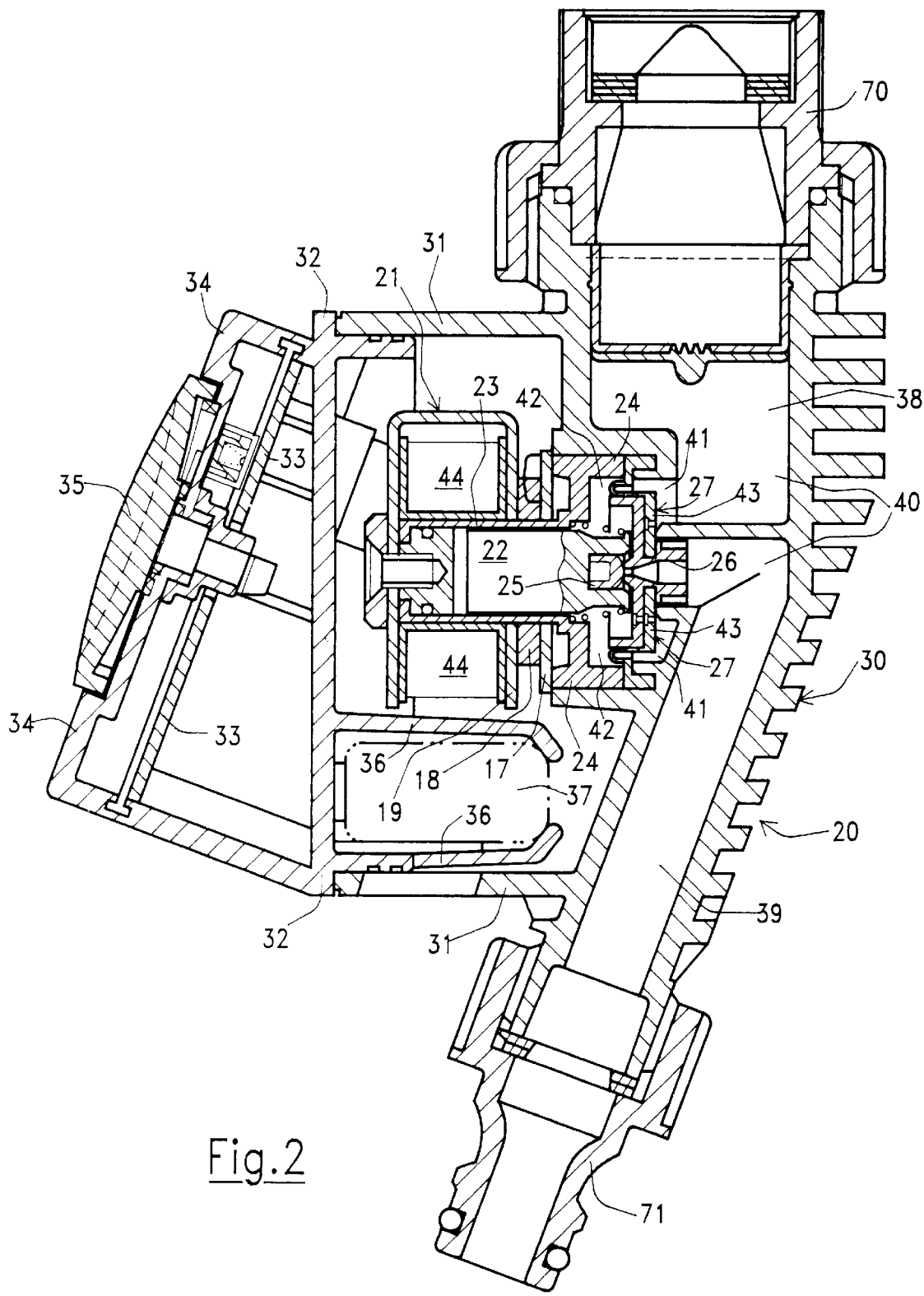
FIG. 2 is a cross-sectional view taken along the line II—II of FIG. 1 of said control box.

With reference to FIGS. 1 and 2, a control box according to the invention comprises a case 20 substantially of the type described in the European patent application No. 0745322 filed on 30 May 1995 in the name of the same applicant.

The case 20 consists substantially of a main casing 30 on which there are mounted an inlet sleeve 70 and an outlet fitting 71. The inlet sleeve 70 is connected to an inlet conduit 38 obtained in the casing 30; the outlet fitting 71 is connected to an outlet conduit 39, also obtained in the casing 30. Between the inlet conduit 38 and the outlet conduit 39 there is a section 40 for intercepting the liquid 40.

The casing 30 also comprises a shell 31 housing a solenoid valve 21. A closing element 32 of the shell 31 also acts as a support for the printed-circuit board 33 of an electronic control unit of the control box (described later). Above the printed-circuit board 33 there is mounted a panel 34 with a circular seat for the handgrip 35 of a printed-circuit rotary switch fitted on the board 33. On the closing element 32 it is possible to hinge a cover that can be tipped over (not shown) that, when closed, covers the panel 34 completely. As can be seen in FIG. 1, there is on the panel 34 a circumferential succession of indices corresponding to the various angular positions that the rotary switch can assume (in the example shown, sixteen positions).

The closing element 32 is also provided with a pair of flexible jaws 36 extending inside the shell 31 and suitable for connecting to a battery 37.

The solenoid valve 21 is of the type described in the U.S. Pat. No. 5,655,747, to which reference is made for a more detailed description. It is a low-consumption bistable electromagnetically-operated solenoid valve, because the solenoid valve has to be supplied only for short time intervals during its opening or closing, while once it has been opened or closed there is no longer any absorption of electrical energy.

The solenoid valve 21 comprises a steel piston 22 slidable in a chamber defined by a cylindrical appendix 23 of a flange 24. Round said cylindrical appendix 23 there are a disc 17 in galvanized sheet metal, a permanent magnet 18 and a support 19 in galvanized sheet metal for an electrical winding (coil) 44. The support 19, the magnet 18, the disc 17 constitute a magnetic circuit wherein there are concentrated the magnetic flux lines generated by the winding 44 when an electrical current circulates inside it.

The piston 22 has at one of its ends a rubber pad 25 that, when the piston 22 is in the position shown in FIG. 2, closes a hole 26 made in gasket casing 27, thus preventing the liquid present in a first annular chamber 41, communicating with the inlet conduit 38, and in a second annular chamber 42, communicating with the first annular chamber, from passing in the outlet conduit 39. When, following a signal from the electronic control unit, the piston 22 slides away from the gasket casing 27, the pad 25 frees the hole 26, and the liquid present in the second chamber 42 passes into the outlet conduit 39; the depression that is created in the second chamber 42 determines the movement of a membrane 43, thus making it possible for the liquid present in the first chamber 41 to pass to the outlet conduit 39.

Figure 3:
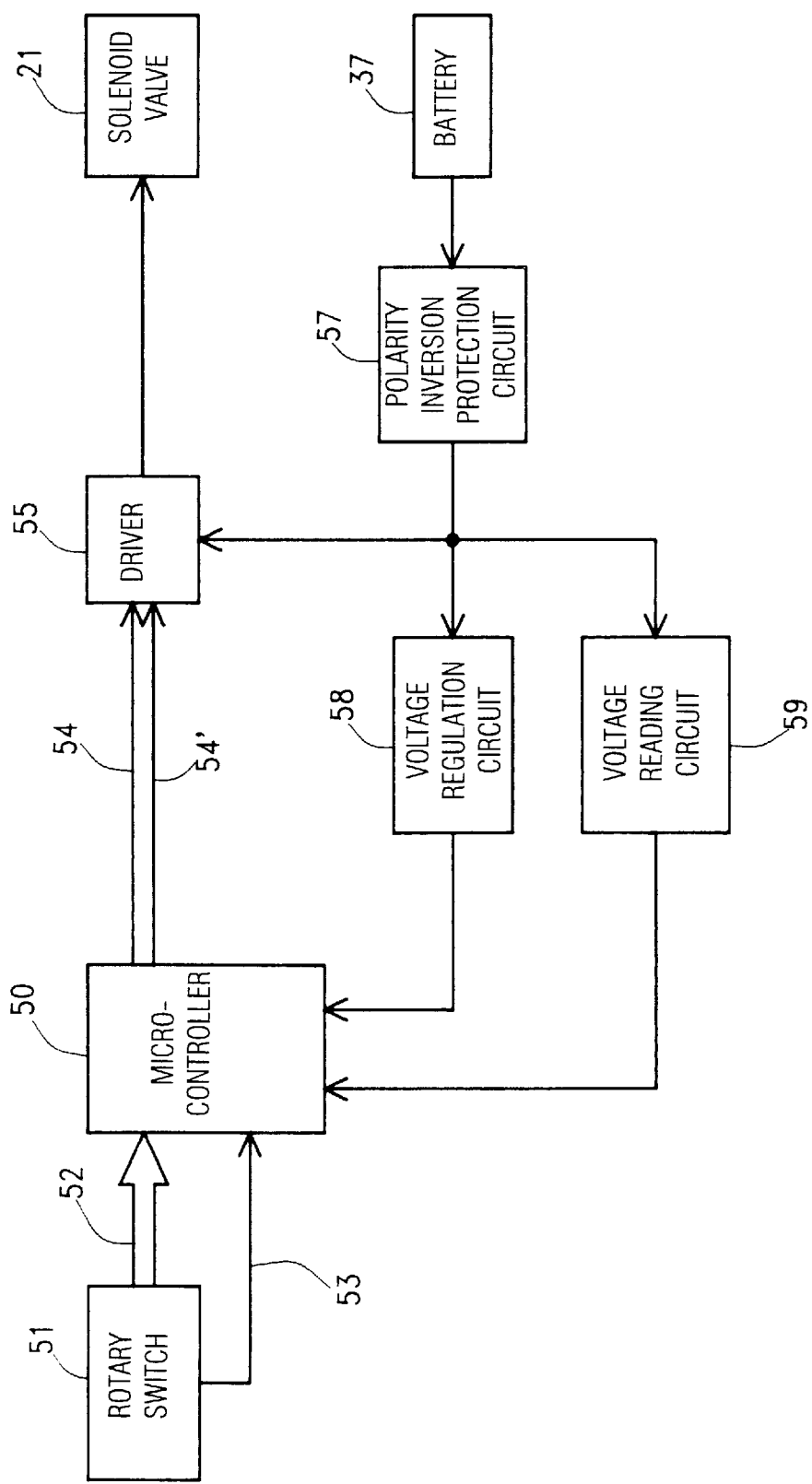
FIG. 3 is a functional block diagram of the electronics of the control box.

FIG. 3 is a block diagram of the electronic control unit of the control box. It comprises a microcontroller 50 provided with an internal memory wherein there are memorized the irrigation programs predefined by the manufacturer and the program that governs the control box. The microcontroller 50 receives at input from the rotary switch 51 a plurality of signals 52, in a number equal to the number of distinct programs that can be selected, each signal being activated when the rotary switch is rotated in one respective of the positions indicated with "1"–"15" in FIG. 1. A further signal 53, activated when the rotary switch is rotated in a test position of the control box (indicated with "0" in FIG. 1) distinct from the preceding positions is sent to a reset input of the microcontroller 50. The microcontroller, through two output signals 54, 54', controls a driver device 55 that in turn operates the bistable solenoid valve 21 determining its opening and closing (one signal, say 54, operates the opening of the solenoid valve, the other the closing).

The electronic control unit is supplied by a battery 37, for example a 9-volt alkaline battery. The battery 37 is connected to a circuit 57 of protection against the inversion of the polarity (to avoid damage caused by an incorrect connection of the battery with the positive and negative poles inverted). The output of the circuit 57 supplies directly the driver 55 and a voltage-regulating circuit 58 that provides the microcontroller 50 with a stable voltage at the desired value, normally less than the voltage of the battery. There is also a circuit 59 to read the value of the voltage of the battery 37 (substantially it is a device for measuring the voltage that makes a comparison between the voltage of the battery with a reference voltage that acts as a minimum threshold voltage of the battery) whose output is sent to the input of the microcontroller 50.

Figure 4:
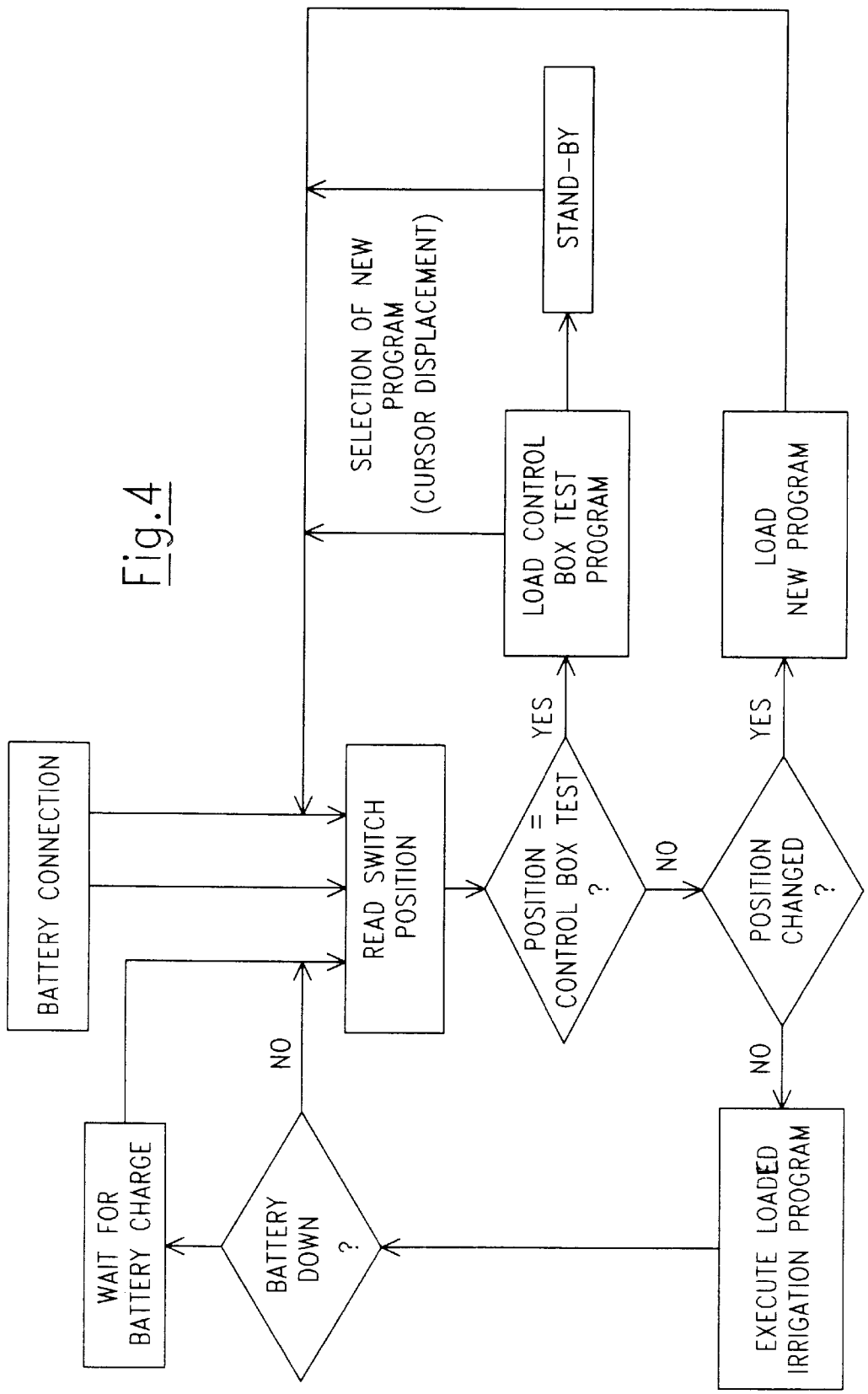
FIG. 4 is a flow diagram of the program that governs the control box.

The operation of the control box will be described hereinafter making reference to the flow diagram of FIG. 4. When the control box is turned on, that is, when the battery is connected up, after an initialization step of the microprocessor 50, the latter closes the solenoid valve 21 and reads the current position of the rotary switch 51, checking which of the signals 52 is activated. If the switch 51 is in the test position, corresponding to the position indicated in FIG. 1 with "0", the test program of the control box is activated that, after a pre-established time interval of about 15 seconds, provides for the opening of the solenoid valve 21 for a pre-established time interval of three minutes, after which the solenoid valve 21 is closed again. The control box is then placed in a low-consumption stand-by position, wherein it remains until the position of the rotary switch is changed. The test position can also be selected for a manually-operated irrigation that has not been programmed.

When the rotary switch is rotated to a position other than that of testing, the irrigation program corresponding to the new position of the switch is activated, that is, it is loaded in a dynamic memory inside the microprocessor to be executed: each irrigation program provides for opening the solenoid valve 21 for a pre-established time and with a pre-established frequency of intervention.

In the example shown there are fifteen distinct irrigation programs, corresponding to the fifteen positions "1"–"15" of the switch shown in FIG. 1. Such irrigation programs can for example provide for the following lengths of time of opening of the solenoid valve and frequencies of intervention:

| | PRESET TIMES | |
|---|---|---|
| switch position | Cycle length (minutes) | Frequency |
| "1" | 5 | every 6 hours |
| "2" | 15 | every 6 hours |
| "3" | 15 | every 12 hours |
| "4" | 15 | every 24 hours |
| "5" | 30 | every 24 hours |
| "6" | 60 | every 24 hours |
| "7" | 90 | every 24 hours |
| "8" | 15 | every 48 hours |
| "9" | 30 | every 48 hours |
| "10" | 60 | every 48 hours |
| "11" | 15 | every 72 hours |
| "12" | 30 | every 72 hours |
| "13" | 60 | every 72 hours |
| "14" | 60 | every 168 hours |
| "15" | 120 | every 168 hours |

When the switch is rotated to select a different irrigation program, if the solenoid valve is open it is immediately closed.

All the irrigation programs, after being selected by rotating the rotary switch to the corresponding position, before it starts the execution step are preceded by a stand-by step of six hours, after they have elapsed the microprocessor starts the execution of the selected irrigation program starting with the opening of the solenoid valve 21.

Moreover, during the execution of any one irrigation program, before emitting the opening signal and during each period of closing of the solenoid valve the microcontroller 50 performs a check on the state of the charge of the battery and checks the state of the output signal of the circuit 59. If the charge level of the battery is deemed sufficient, the microcontroller proceeds with opening the solenoid valve 21; if on the other hand the charge level of the battery is not deemed sufficient, the execution of the current irrigation program is suspended until the battery has been replaced. In this way the solenoid valve is not opened, and the irrigation is not enabled, whenever there is no certainty that sufficient energy is available to close the solenoid valve again correctly. It is also possible to perform a check at any time on the state of the charge of the battery, placing the control box in the test mode (position "0" of the switch): if, as previously described, after about fifteen seconds the solenoid valve opens, the level the charge of the battery is sufficient; if, on the other hand, after fifteen seconds have elapsed the solenoid valve does not open, it means that the battery is flat and should be replaced.

The one described previously can be one of several different operational modes of the irrigation control box. It is in fact possible, for example by providing a selector on the printed-circuit board of the electronic control unit, to select one among several operational modes of the control box, represented by as many parts of code that are executed by the microprocessor; the latter, when it is switched on, reads the state of the selector and determines which of the operational modes to execute.

For example, a second operational mode can differ from the one described above due to the fact that each irrigation program is executed immediately after its selection by means of the rotary switch (for example after 5 seconds), instead of being preceded by the six-hour stand-by step, and due to the fact that when the switch is placed in the test position ("0") the control box is placed in a stand-by condition without first proceeding to the opening of the solenoid valve for three minutes.

I claim:

1. An irrigation control box comprising an electronic control unit that controls opening and closing of a solenoid valve that intercepts a flow of irrigation liquid, said electronic control unit comprising a memory in which a plurality of predefined distinct irrigation programs are memorized, said control box further comprising a control panel on which a rotary switch is arranged that can be positioned in a plurality of distinct angular positions, in each of which the rotary switch controls the electronic control unit to cause the selective activation of a respective one of said memorized irrigation programs.

2. An irrigation control box according to claim 1, characterized in that said electronic control unit comprises a microcontroller suitable for receiving from said rotary switch signals identifying the angular position of the rotating switch and for activating the corresponding irrigation program, and for sending signals to a device for driving the solenoid valve.

3. An irrigation control box according to claim 2, characterized in that said electronic control unit comprises a battery for supplying the electronic control unit and the solenoid valve.

4. An irrigation control box according to claim 3, characterized in that said electronic control unit comprises means for checking the level of the charge of said battery connected to the microcontroller to inhibit the opening of the solenoid valve when the level of the charge of the battery is less than a pre-established safety level.

5. An irrigation control box according to claim 1, characterized in that said solenoid valve is a bistable electromagnetically-operated solenoid valve.

6. An irrigation control box according to claim 1, characterized in that there is a position of the rotary switch wherein said electronic control unit activates a test procedure of the control box to check the operation of the solenoid valve.

7. An irrigation control box according to claim 6, characterized in that said test procedure provides for opening of the solenoid valve after a first pre-established time interval, and closing of the solenoid valve after a second pre-established time interval.

* * * * *